(12) United States Patent
Miller et al.

(10) Patent No.: US 9,908,065 B2
(45) Date of Patent: Mar. 6, 2018

(54) HYBRID SCAVENGER, SEPARATOR SYSTEM AND METHOD

(71) Applicant: ECONOVA, INC., Clearfield, UT (US)

(72) Inventors: C. Michael Miller, Pleasant Grove, UT (US); David A. Bell, Farmington, UT (US)

(73) Assignee: THOUGHT PRESERVE, LLC, Fallbrook, CA (US)

( * ) Notice: Subject to any disclaimer, the term of this patent is extended or adjusted under 35 U.S.C. 154(b) by 587 days.

(21) Appl. No.: 14/476,041

(22) Filed: Sep. 3, 2014

(65) Prior Publication Data

US 2015/0021281 A1    Jan. 22, 2015

Related U.S. Application Data

(63) Continuation of application No. 14/336,220, filed on Jul. 21, 2014, which is a continuation of application
(Continued)

(51) Int. Cl.
| | |
|---|---|
| *B01D 17/02* | (2006.01) |
| *B04B 11/02* | (2006.01) |
| *B04B 13/00* | (2006.01) |
| *B04B 1/04* | (2006.01) |
| *B04B 5/04* | (2006.01) |

(Continued)

(52) U.S. Cl.
CPC ..... *B01D 17/0217* (2013.01); *B01D 17/0214* (2013.01); *B01D 17/12* (2013.01); *B04B 1/04* (2013.01); *B04B 5/0442* (2013.01); *B04B 11/02* (2013.01); *B04B 13/00* (2013.01); *C02F 1/008* (2013.01); *C02F 1/20* (2013.01); *C02F 1/38* (2013.01); *C02F 1/40* (2013.01); *B04B 2013/006* (2013.01); *C02F 1/286* (2013.01); *C02F 2101/32* (2013.01);
(Continued)

(58) Field of Classification Search
CPC B01D 17/0217; B01D 17/0214; B01D 17/12; C02F 1/38; C02F 1/20; C02F 2101/32; C02F 1/286; C02F 2301/022; C02F 2301/10; B04B 1/04; B04B 5/0442; B04B 13/00; B04B 11/02; B04B 2013/006
USPC ............... 210/787, 188, 201, 252, 259, 800; 494/36, 37, 50, 53, 66
See application file for complete search history.

(56) References Cited

U.S. PATENT DOCUMENTS

| | | |
|---|---|---|
| 6,348,154 B1 | 2/2002 | Stewart |
| 7,060,017 B2 | 6/2006 | Collier |

(Continued)

FOREIGN PATENT DOCUMENTS

EP      1949965 A1 * 7/2008 ............... B04B 1/00

OTHER PUBLICATIONS

Exterran, Deep Bad Nutshell Filter Evolution, p. 1-15, 2013.
(Continued)

*Primary Examiner* — Charles Cooley
*Assistant Examiner* — Shirley S Liu
(74) *Attorney, Agent, or Firm* — Pate Baird, PLLC

(57) ABSTRACT

A hybrid scavenger operates downstream of a separator such as a gunbarrel separator for petroleum production. The separator may be overdriven to maximize use of a permitted reinjection rate. The hybrid scavenger then extracts water from the oil and oil from the water without having to treat the entire stream of incoming production fluids.

4 Claims, 4 Drawing Sheets

Related U.S. Application Data

No. 14/104,970, filed on Dec. 12, 2013, which is a continuation of application No. 14/104,916, filed on Dec. 12, 2013, now Pat. No. 9,433,877.

(60) Provisional application No. 61/814,760, filed on Apr. 22, 2013.

(51) Int. Cl.

| | | |
|---|---|---|
| *B01D 17/12* | (2006.01) | |
| *C02F 1/20* | (2006.01) | |
| *C02F 1/38* | (2006.01) | |
| *C02F 1/40* | (2006.01) | |
| *C02F 1/00* | (2006.01) | |
| *C02F 1/28* | (2006.01) | |
| *C02F 101/32* | (2006.01) | |
| *C02F 103/10* | (2006.01) | |

(52) U.S. Cl.
CPC ...... *C02F 2103/10* (2013.01); *C02F 2209/03* (2013.01); *C02F 2301/022* (2013.01)

(56) References Cited

U.S. PATENT DOCUMENTS

| | | | | |
|---|---|---|---|---|
| 8,187,474 | B2 | 5/2012 | Freeman | |
| 8,425,782 | B2* | 4/2013 | Culler | C02F 1/006 210/103 |
| 2008/0053900 | A1* | 3/2008 | Shafer | C02F 9/00 210/631 |
| 2008/0173592 | A1* | 7/2008 | Patel | B04B 1/00 210/787 |
| 2009/0204419 | A1 | 8/2009 | Stewart | |
| 2009/0223858 | A1* | 9/2009 | Nahmad | B01D 1/00 208/13 |
| 2013/0020240 | A1* | 1/2013 | Matthew | B01D 39/00 210/141 |
| 2014/0069821 | A1* | 3/2014 | Marcin | C25B 15/00 205/498 |

OTHER PUBLICATIONS

McGraw Hill Higher Education, Unit Operations of Chemical Engineering, Seventh Edition, p. Chapter 2, p. 39-41, 2005.

Eastern Economy Edition, Transport Processes and Separation Process Principles, Christie John Geankoplis, Fourth Edition, p. 932-939, 2003.

John Wiley & Sons, Department of Chemical Engineering, R. Byron Bird, Warren E. Stewart, Edwin N. Lightfoot, Transport Phenomena, p. 85, 1960.

Wiley-India, Dale E. Seborg, Process Dynamics and Control, Second Edition, Thomas F. Edgar, Duncan A. Mellichamp, p. 159-160 and p. 433-435, 2004.

McGraw Hill, Perry's Chemical Engineers' Handbook, Eighth Edition, Don W. Green, p. 18-114-116, 15-91-93, and 15-96-102, 2008.

High-Tech Consultants, Inc., Oilfield Water-Oil-Solids Separation, Bill Ball, Sep. 19, p. 1-17, 2005.

IOP Publishing, Nanostructured materials for water desalination, T. Humplik, J. Lee, S.C. O'her, B.A. Fellman, M.A. Baig, S.F. Hassan, M.A. Atich, F. Rahman, T. Laoui, R. Karnik, E.N. Wang, p. 1-19, 2011.

* cited by examiner

HYBRID SCAVENGER, SEPARATOR SYSTEM AND METHOD

RELATED APPLICATIONS

This application: is a continuation-in-part application of co-pending U.S. patent application Ser. No. 14/336,220, filed Jul. 21, 2014, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD, which claims the benefit of U.S. Provisional Patent Application Ser. No. 61/814,760, filed Apr. 22, 2013, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD; continuation-in-part of co-pending U.S. patent application Ser. No. 14/104,970, filed Dec. 12, 2013, entitled DYNAMIC, INFLUENT-CONSTITUENT-BASED, SEPARATOR CONTROL APPARATUS AND METHOD, which claims the benefit of U.S. Provisional Patent Application Ser. No. 61/814,760, filed Apr. 22, 2013, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD; and is a continuation-in-part of U.S. patent application Ser. No. 14/104,916, filed Dec. 12, 2013, entitled AUTOMATIC, ON-THE-FLY, SEPARATOR OPTIMIZATION APPARATUS AND METHOD, issued as U.S. Pat. No. 9,433,877 on Sep. 6, 2016; which claims the benefit of U.S. Provisional Patent Application Ser. No. 61/814,760, filed Apr. 22, 2013, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD; all of which are hereby incorporated by reference. This application also hereby incorporates by reference U.S. Pat. No. 6,607,473 entitled METHODS FOR CENTRIFUGALLY SEPARATING MIXED COMPONENTS OF A FLUID STREAM UNDER A PRESSURE DIFFERENTIAL issued Aug. 19, 2003 to Collier.

BACKGROUND

1. Field of the Invention

This invention relates to separators, and, more particularly, to novel systems and methods for separating water and oil from petroleum production fluids.

2. Background Art

Gunbarrel separators are used for separation of water and oil, common "production fluids" in the petroleum industry. Typically, a gunbarrel separator amounts to a separating tank in which the lighter petroleum products rise through the heavier production water constituent. The system typically includes a flume amounting to a comparatively larger diameter tube that eventually feeds into a comparatively smaller diameter tube. These two tubes, the flume and the inlet tube, connected in series, result in transporting the entire inlet fluid mixture down through the center of the tank of a gunbarrel separator. Near the bottom of the tank, a distribution plate is attached like a flange around the inlet tube in order to enforce the distribution radially of the fluid mixture introduced into the tank. Thus, all of the mixture is introduced near the bottom of the tank.

Over time, the lighter species (e.g., crude oil or petroleous products), being lighter than the heavier species (e.g., water, brine) will rise through the heavier species. These eventually separate out to leave a lower quantity of the heavier species below an upper layer of the lighter species.

Also, one reason why the flume has a comparatively larger diameter than does the inlet line is that the production of an oil well may contain liquid (e.g., crude oil), including the liquid brine, as well as gases, including natural gas, air, and other trace compositions. Thus, by providing some space for the entrained gases to escape their mixture with liquid, and even to permit absorbed non-condensables to come out of solution, the flume acts as a liquid-gas separation chamber. Thus, the tank itself becomes primarily a liquid-liquid separator, separating lighter species from heavier species.

Gunbarrel separators, as well, as other types of separators, are typically tuned to a particular set of operating parameters. For example, oil, to be commercially useful, must have almost all the water removed. The percentage of water remaining affects the price of oil. However, gunbarrel separators are tuned (adjusted) to meet the dehydration specification for oil. The purity of the production water is often sacrificed to do so.

To be reinjected, put back down into injection wells or disposal wells, the brine needs to be stripped of crude oil products. The maxim "a clean well is a healthy well" refers to the fact that the porosity, efficacy, capacity, and so forth for an injection well depend on the constituents being placed down the well. Removal of solids, petroleum products, and the like assist in resisting fouling of the well, which would increase fluid dynamic drag on the injected flow as well as eventually sealing off the well and rendering it unsuitable for continued injection.

Scavenging unwanted constituents from effluents exiting separators is not relied upon in the oil and gas industry (petroleum production). Reducing unwanted fluid constituents down to percentages of less than a few percent is not done in that industry. Reducing below one percent or into parts per million of oil in water or water in oil is unheard of in the industry. Economics of equipment and throughputs would make such a concept irrational.

Thus, it would be an advance in the art to economically improve the operation of a gunbarrel separator or other separation system. Less water content in oil improves the quality thereof, and therefore the price. Likewise, it would be an improvement to provide a better mechanism for removing oil from the brine to be reinjected. Since injection wells have an allowed capacity, literally permitted by governmental permit, fouling a well destroys valuable capacity permitted for disposal in that well. Likewise, any oil stripped out of the water adds to the production "oil," and is subject to the same parameters establishing its value if better dehydrated.

BRIEF SUMMARY OF THE INVENTION

In view of the foregoing, in accordance with the invention as embodied and broadly described herein, a method and apparatus are disclosed in one embodiment of the present invention as including an optimization system for scavenging oil from water and water from oil after passing through a conventional separator, such as a gunbarrel separator. Likewise, in certain embodiments, the scavenger system may operate to increase the overall efficiency of a system by supporting overdriving, de-rating, or both of a gunbarrel or other separator system.

For example, prior art separator systems are tuned or adjusted in order to maximize or otherwise optimize the quality of the petroleum product in order to maximize the value of the output of a well. Separation is a time-dependent process. Thus, the optimal operation of a separator, and particularly a gunbarrel separator, is improved by taking more time to complete the separation. However, efficiency dictates that the system should be operated to maximize the separation of the oil at the permitted or the allowable dehydration level demanded by the market. That is, the oil must be dehydrated of water to a level required by the specification and price demanded by the market into which the oil will be sold.

In an apparatus and method in accordance with the invention, the separator may be overdriven and its output quality de-rated in order to maximize the throughput of water. This may send to an injection well the maximum amount of reinjected waste water permissible. Scavengers in accordance with the invention are added to the system, thus adding an additional stage of separation, but each requiring less throughput. The hybrid scavenging of an overdriven separator in accordance with the invention are therefore supporting a much more precise and complete separation of water out of the oil being prepared for market. Meanwhile, the hybrid-scavenger system in accordance with the invention also takes a portion of the removed water, and strips off the remaining oil therein. Thus it is possible to optimize and improve the quality of that water in order to improve the performance and longevity of the injection well in which that water will be disposed of. Thus, the overall system may be optimized by overrunning the separator beyond its design capacity in order to optimize instead the use of the permit for disposal of production brine. Meanwhile, the scavengers are hybrid in nature, because two different systems are set up, one to handle dehydration of the oil and one to handle stripping of oil out of the water in order to still permit the best quality of marketable oil and re-injectable water but each based on much less flow than the entire flow through the separation system.

An apparatus in accordance with the invention may typically include a separator system, receiving an influent and separating the influent into a comparatively lighter species and a comparatively heavier species. The separator system, overdriven in outputting at least one effluent stream by being operated away from a design point corresponding thereto, has a design point existing in a mathematical space representing a set of values of operational parameters corresponding to and controlling operation of the separator system.

The apparatus includes at least one scavenger, receiving the effluent stream or streams, each comprising predominantly one of the comparatively heavier species and the comparatively lighter species. The result is a scavenger remediating the performance or lack thereof occurring due to the overdriving of the separator system. The scavenger does so by removing an additional quantity of one of the comparatively heavier species and comparatively lighter species from the respective effluent stream.

A pre-treatment system receiving the influent upstream from the separator systems may be added for providing a pre-treated influent to the separator system. It is typically a liquids-solids separator. It may be selected from several suitable types, including a filter, a cyclone, a flotation system, a chemical injector, a clarifier, a decanter, and a centrifugal decanter.

Remediating may be done by one or more of several methods. These include rectifying (e.g., purifying, dehydrating, etc.) the comparatively lighter species to within a market specification preselected for the disposition of the lighter species by removing an additional quantity of the heavier species. Alternatively, or in addition, a method of stripping out an additional quantity of the comparatively lighter species from the comparatively heavier species may be done prior to conventional disposition of the comparatively heavier species.

If two scavengers are used, a first scavenger, operating as a light post processor scavenger, may be responsible for rectifying the comparatively lighter species. Meanwhile a second scavenger, operating as a heavy post processor scavenger, may be operably connected to the separator system and operably connected to the first scavenger. It may thereby receive a heavy residual comprising an amount of the comparatively heavier species received from the first scavenger. It may then separate therefrom a comparatively-lighter-species-rich, light residual, and send the light residual to the separator system for inclusion with the influent. One or both of the first and second scavengers may be or include a continuous centrifugal separator.

The continuous centrifugal separator function is extremely well served by a laminar annular velocity distribution centrifuge as described in detail in patent applications incorporated hereinabove by reference. That centrifugal separator may operably connect to deliver production petroleum products at a preselected value of dehydration from water specified by a market value of the such petroleum compositions as the comparatively lighter species.

One or more of the scavengers may be or include a back-washable filter. A suitable filter medium may be an oleophilic medium, such as nut hulls or the like, selected to attract and hold the comparatively lighter species (petroleum, oil, etc.). Alternatively, or in addition, a porous medium may be selected to remove droplets of one of the comparatively lighter and comparatively heavier species from the other.

One may think of one of the scavengers, operating as a heavy post processing scavenger, stripping droplets of the lighter species from the comparatively heavier species. The other scavenger, operating as a light post processor scavenger, may operably connect to the separator system and operably connect to the one scavenger to accomplish several tasks. It may receive a light residual comprising an amount of the comparatively lighter species received from the one scavenger and separate therefrom a comparatively-heavier-species-rich, heavy residual. It may send the heavy residual to the separator system or to the other scavenger for inclusion with the respective influent.

The separator may often be a gunbarrel separator. At least one scavenger may be constituted as a laminar annular velocity distribution centrifuge operating at a setting of operational parameters selected to provide rectification of the comparatively lighter species to a level specified by a market price for the comparatively lighter species. Any back-washable oil filter should be sized and rated to remove traces of the comparatively lighter species from the comparatively heavier species down to a value selected to extend the lifetime of an injection well while maximizing the use of a disposal permit corresponding to the injection well.

If first and second scavengers exist, the first may be a laminar annular velocity distribution centrifuge operating continuously. It may be controlled by a set of operational parameters selected to provide rectification of the comparatively lighter species to a level specified by a market price for the comparatively lighter species. In such a case, the second scavenger may be or contain a back-washable oil filter sized and rated to remove traces of the comparatively lighter species from the comparatively heavier species down to a value selected to extend the lifetime of an injection well while maximizing the use of a disposal permit corresponding to the injection well.

A method in accordance with the invention is useful for separating, with comparatively high rates of purity (less than one percent contaminants, down to tens of parts per million) a comparatively heavy species from a comparatively light species. Using a separator system, receiving an influent, the method separates the influent into a comparatively lighter species and a comparatively heavier species, but is over driven. By overdriving the separator system is meant outputting effluent stream off the design target values of operating parameters. Stated another way, it is operating away from a design point existing in a mathematical space representing a set of values of operational parameters corresponding to and controlling operation of the separator system.

One or more scavengers each receive an effluent stream of predominantly one of the comparatively heavier lighter species. A scavenger remediates the degraded performance of the separator system arising due to the overdriving. It does so by removing an additional quantity of one of the contaminating species (heavier or lighter) from the other species. A scavenger may rectify (e.g., purify, dehydrate) the comparatively lighter species (e.g., oil, petroleum composition) to a value of purity corresponding to a preselected market price. Another scavenger may remove from the comparatively heavier species traces of the lighter, down to a value preselected for optimizing it. Optimizing may include maximizing the amount of disposal of the comparatively heavier species (e.g., brine) permitted by a government-issued permit. It may include maximizing the longevity of a re-injection disposal site by reduction of the fraction of contained contaminants (e.g., oil or other comparatively lighter species).

All the foregoing functions may be done alone or all in combination. A first scavenger may receive the predominantly lighter species from the separator to rectify, while a second may strip from the heavier species traces of the lighter species. This has been demonstrated down to tens or hundreds of parts per million. More throughput, and cleaner brine result in maximizing the amount of disposal of the comparatively heavier species, as permitted by a government-issued permit, and maximizing the longevity of a re-injection disposal site, respectively. This latter results by reduction of the fraction of contained contaminants (organic, carbon compounds, etc.) corresponding to the comparatively lighter species.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
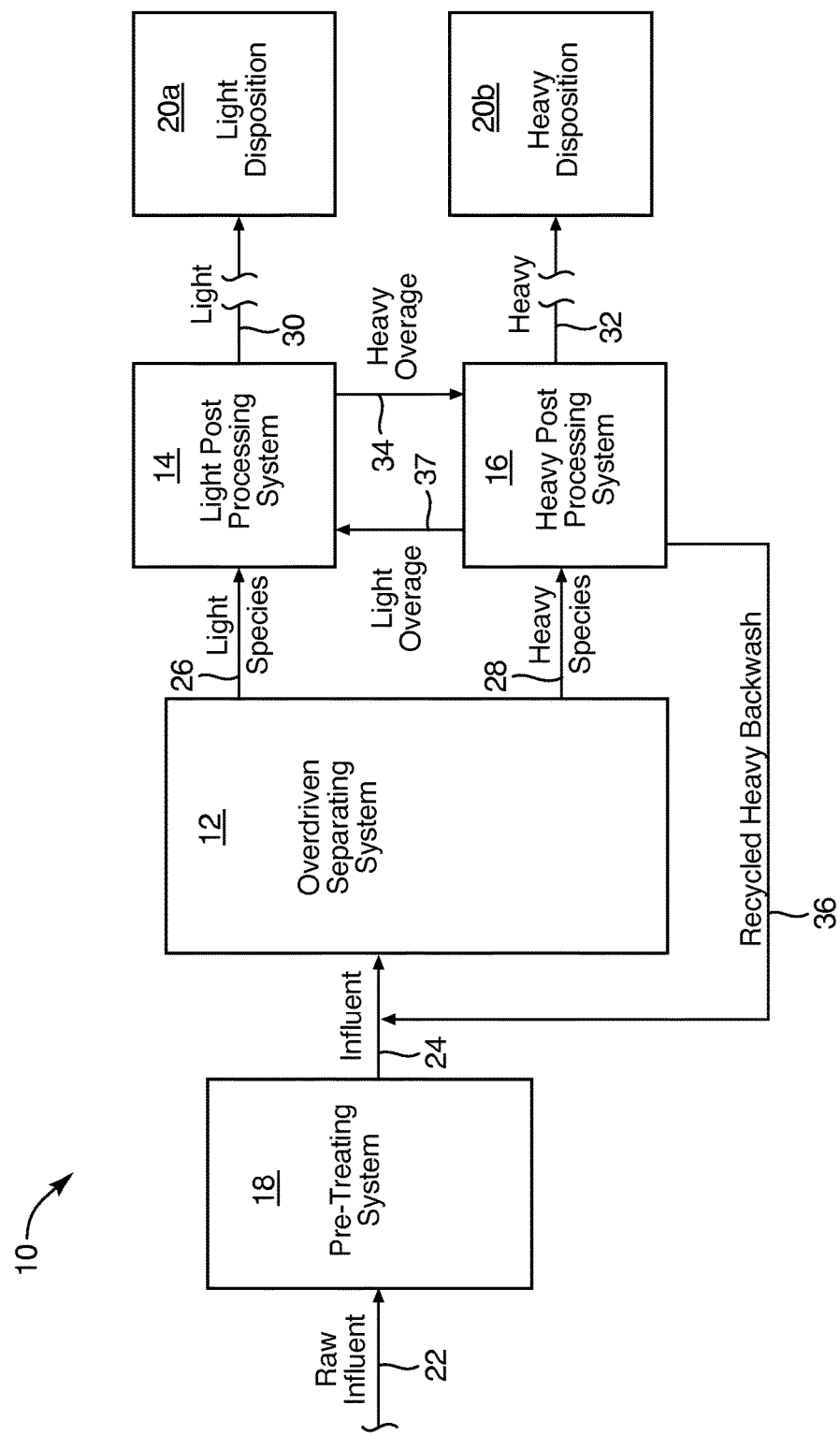
FIG. 1 is a schematic block diagram of a high level process for hybrid scavenging of contaminants in each of the light and heavy flows exiting a separation system that is being overdriven beyond its design point and thus producing output beyond its rated capacity.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a system 10 in accordance with the invention may have as a central element thereof a separator 12. Separators 12 come in large variety. Cylindrical drum separators are available, settling tanks in a wide variety of configurations exist, and so forth. One suitable separator 12 is called a gunbarrel separator, which will be discussed hereinbelow. The separator 12 in this illustrated embodiment is typically run at a setting or at values of the operational parameters thereof different from those of its design. They are specifically quite different from any optimized values thereof.

In general, a separator 12 is designed for a specific throughput. Importantly, where a light species and heavy species are separated from one another, each may have cost and value. In the petroleum production industry, the brine typically has no value. Disposition thereof is a cost. The oil has a value. However, that oil has a specification specifying how much water is permitted to be present.

Buyers of petroleum products will specify a price for a degree of purity or freedom from basic sediments and water (BS&W). Anything outside of the specified value of basic solids, water, or both will be granted a different, typically a much lower value in the market place.

The separator 12 has been designed to operate with a specific throughput, and provide a particular specification of separation. However, optimizing the operational parameters of a separator 12 in order to provide the proper level of dehydration of the lighter species (e.g., oil) will typically result in the heavier species (e.g., production water or brine) exiting at some fraction or some volumetric flow rate or mass flow rate that simply corresponds to whatever the original influent contained. Thus, a separator 12 is typically set up to optimize some quality level of one of the separated species.

Meanwhile, it is built at a size that produces the proper throughput in the quality range desired. In one embodiment of an apparatus and method in accordance with the invention, the separator 12 may be set up to run at a value that does not optimize the quality or does not meet the specification for the quality of the principal output. For example, disposition of the heavier species (water) in a petroleum production separation process is controlled by certain permits.

Water is typically disposed of by a re-injection. A certain amount of production water may be used for limited purposes. However, typically, such water constitutes a brine not useful in culinary nor agricultural endeavors. Thus, one disposal method for production brine from petroleum production is re-injection into a "disposal well."

Typically, a disposal well is permitted, literally, by permits issued by governmental entities. Thus, a producer may dispose of a certain amount of brine per day down a disposal well. One result of such permits is that disposal wells are under utilized. Some reserve capacity may be left in the rate in which brine is disposed of in gallons per day, pounds per day, tons per day, or the like. Thus, the disposal of water has a permit limit on how much water may be disposed of, same portion of which limit is unused.

Similarly, as the comparatively lighter species (typically oil) has a market-driven quality standard or fraction of water allowed, the heavier species (typically production brine) has some specification for the amount of oil that may linger within it. The purity of the brine may be extremely important in that excess hydrocarbons from oil production remaining in the production brine after separation after the oil products will go down the re-injection well. This causes two difficulties. The first is simply the fact that extra petroleum products in the oil tend to foul the injection well, thus closing off porosity and limiting useful life. Also, any premature limit or any failure to meet the daily permitted maximum, and that much water capacity that could have been re-injected into a re-injection well is lost.

Second, notwithstanding there is a comparatively small amount of oil in the water, the volumes of water are substantial. Accordingly, a significant quantity of oil is lost, which could be sold, if improved extraction and dehydration of trace amounts of oil from the production brine were possible. In an apparatus and method in accordance with the invention, both of these are done in a more cost effective manner optimizing the use of the disposal permit for water.

Running a separator system 12 at settings of operational parameters displaced off of their designed values will result in inefficiencies, poor quality of heavier species, and poor quality of the comparatively lighter species. By "comparative" is meant with respect to one another. Thus, other systems may be included in order to de-rate or overdrive the separator system 12. In this way, the overall throughput may be optimized not just for the quality of separation, but for maximization of output of the comparatively heavy species. This may also meet the maximum permitted disposition or disposal of the heavy species down the re-injection well.

In the system 10, the separator 12 may output the comparatively lighter species (hereinafter the light species) to a light post-processing system 14. Likewise, the separator system 12 may output the heavy species to a heavy post-processing system 16 for scavenging. In order to improve the performance, pre-treatment 18 or a pretreating system 18 may be placed upstream from the separator 12.

Likewise, the disposition 20, whether the disposition 20a of the light species or the disposition 20b of the heavy species may follow the post-processing 14, 16, respectively. By a combination of pretreating 18 and post-processing 14, 16, the specified quality (purity) suitable for disposition 20a of the light species and disposition 20b of the heavy species may still meet the guidelines or demands, regardless of how restrictive they may be. However, the responsibility for obtaining that quality rests on the light post-processing system 14 and the heavy post-processing system 16. However, the burden on the separator system 12 is relieved to some extent by pretreating systems 18.

In the illustrated embodiment, raw influent 22 may constitute production from a petroleum well. Such production may typically include solids, brine, crude oil (hydrocarbons), as well as natural gas (methane), including some amount of other volatile organic compounds (vapors of hydrocarbons) (VOCs). A pre-treatment system 18 may be tasked with some initial separation of these multiple phases, these three phases, solids, one principal gas, and two principal liquids, from one another.

Pre-treatment 18, typically involves removal of sediments (solids) such as sand, other bits of rock, precipitants, and the like that tend to foul, clog, abrade, and otherwise damage various processing equipment. Pre-treatment 18 may involve various gas injection processes. It may involve sieves such as shaker tables that permit solid materials to drift out of the liquids and be urged (e.g., shaken, scraped, pressed, etc.) out of the liquid for disposal as solid materials. In certain embodiments, the pre-treatment systems 18 may be limited to just those processes that prepare the liquids for proper separation.

The raw influent 22 may thus be characterized as a multi-phase material that may be highly erosive, corrosive, and dimensionally unstable. The presence of gas under pressure may rapidly expand if relieved of that pressure. Likewise, the material may be under pressure or subject to elevated temperatures above ambient condition. Thus, a certain amount of gas may be dissolved in or released from solution. Pre-treatment systems 18 may be directed toward separating out gas from liquid, liquid from solid, or other constituents from one another. Thus, pretreating 18 may involve filters, tortuous paths, traps, vents, gas flotation, and so forth.

Ultimately, the influent 24 results from pre-treatment 18 of the raw influent 22 subject to any conditioning that may have occurred in the pretreating system 18. The separator 12 accordingly divides the light species 26 from the heavy species 28 which are then passed on to their respective post-processing systems 14, 16. One may think of the light flow 26 as an interim flow 26, and the heavy flow 28 as an interim flow 28. Following the light post-processing 14, the resulting light output flow 30 is at a condition suitable for market specification.

For example, crude oil is affected to a certain extent by its content of water, and other impurities. The specification required for the light disposition 20a is met by the light flow 30. Similarly, the heavy output flow 32 or heavy flow 32 represents the flow 32 of the heavy species 28. In order to minimize injection well fouling, as well as recover more of the light species 26 for disposition 20a at market values, the heavy post-processing system 16 is adjusted. It is operated with values of operational parameters that will produce the level of purity of the heavy species 28 in the heavy output flow 32 suitable for heavy disposition 20b (disposition 20b of the heavy species 28).

In certain embodiments, the light post-processing system 14 may dispose of the heavy species 28 as the overage 34. For example, the input flow 26 into the light post-processing system 14 is primarily the light species 26. However, the overage 34 above that light species 26 may result in an overage 34 passed into the post-processing system 16 devoted to the heavy species 28.

As a result of the separation occurring in the heavy post-processing system 16, a recycled flow 36 may flow back into the separating system 12, joining with the influent 24. In certain embodiments, cleaning of the heavy post-processing system 16 results in a comparatively smaller quantity of the heavy species 28 quite contaminated by residual amounts of the light species 26. This may be removed from the heavy species by the heavy post-processing system 16.

Any removed flow 36 of such a contaminated mixture may be input back into the separator system 12 with the influent 24. It need not pass in with the raw influent 22, since it has already been processed once in that pre-treatment system 18, as well as by the separator 12, post-processing system 14, and post-processing system 16. Alternatively a removed flow 37 may pass as a "light overage 37" directly into the light post processing system 14 for purification by the scavenging process occurring therein.

Figure 2:
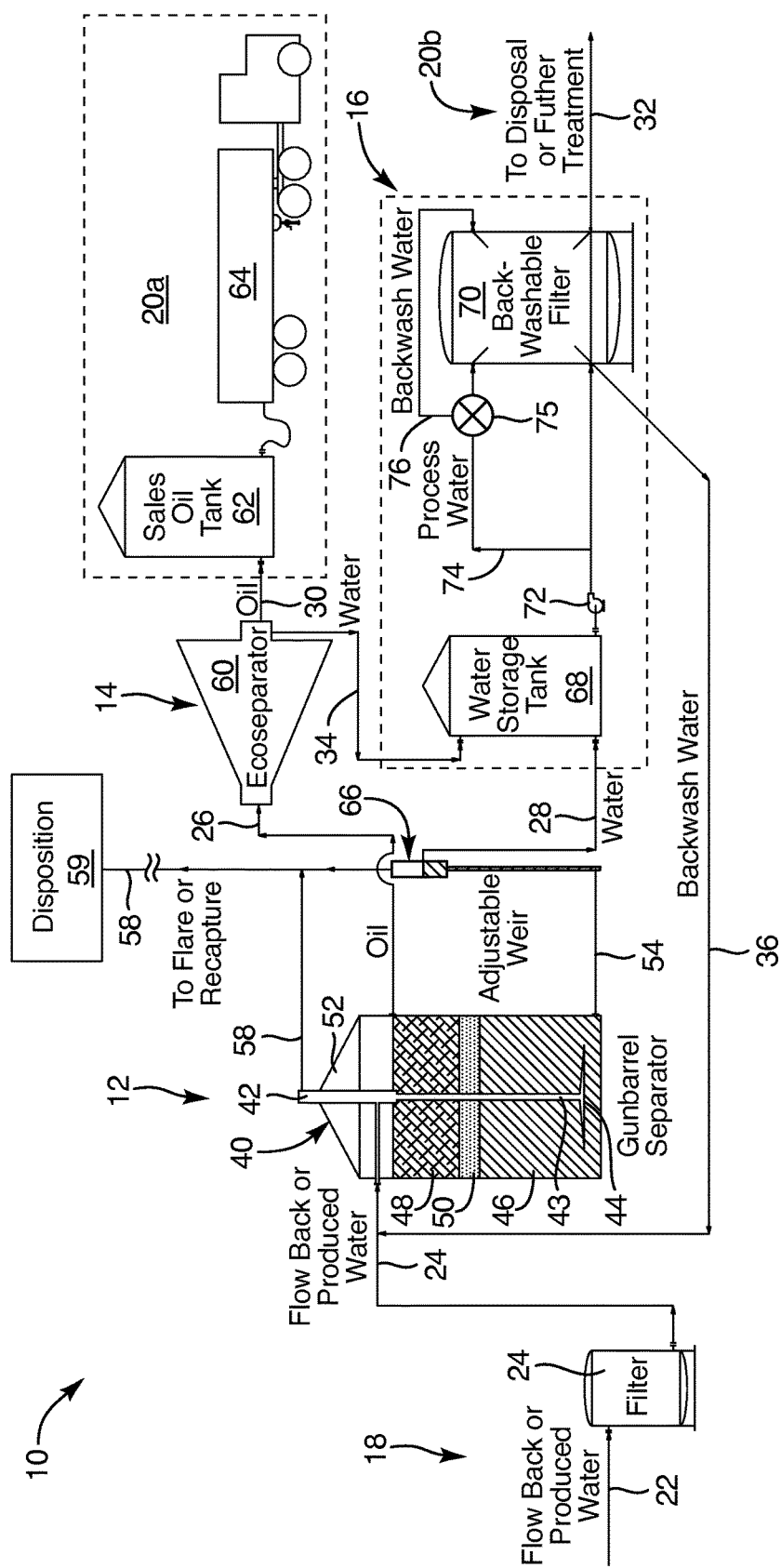
FIG. 2 is a schematic block diagram of one embodiment of the system of FIG. 1 using various technologies in order to dehydrate a portion of the oil flow and to clean up a portion of the production brine flow in order to optimize the use of permitted re-injection of production brine.

Referring to FIG. 2, while continuing to refer generally to FIGS. 1 through 4, in one embodiment, a system 10 may include various components implementing the functions and features identified with respect to FIG. 1. In the illustrated embodiment, a filter 38 may constitute all or part of the pre-treatment system 18. The filter 38 may receive original produced water, flow back from back-washing other filters within the system 10, or a combination thereof. Thus, a filter 38 may operate as a part of or as an entire pre-treatment system 18.

In one embodiment, a separator 40 may constitute a principal mechanism and device 40 or the totality of the separating system 12. In certain embodiments, multiple individual separators 40 may constitute a separating system 12. Various different types of separators 40 may be used. However, in the illustrated embodiment, the separator 40 is a gunbarrel type of separator 40.

Gunbarrel separators have a flume 42 into which the influent 24 may be introduced. Typically, the flume 42 is larger, larger than, but connects to and operates contiguously and continuously with a line 43 or input line 43. Typically, the diameter of the flume 42 is larger than that of the line 43 in order to provide expansion room for contained gases and passage of liquids along the wall of the flume 42, while vapors such as natural gas, air, and other vapors or gases exit up through the center of the flume 42. The annular flow of the liquids around the inside surface while gases flow up the center of the flume 42 is a function of the hydrodynamics. It may be represented by or characterized by an engineering parameter on the basis of which the flume 42 is designed.

The line 43 proceeds downward from the flume 42 to a location near the bottom of the separator 40. The line 43 terminates with a spreader 44 or distributor 44. Typically, the spreader 44 may be a large plate. The plate may be perforated periodically, but need not be. A function of the spreader 44 is to distribute the influent 24 introduced into the flume 42 and line 43 out away from the input line 43. This provides for less of a buoyant plume rising around and in close proximity to the line 43.

With time, the heavy region 46 develops near the bottom of the separator 40. Meanwhile, a light region 48 accumulates the lighter species 48. Between these two regions 46, 48, is a dispersion 50 or dispersion region 50. Thus, a heavy region 46 containing a heavy species 46, and a light region 48 containing a light species 48 do not actually make contact. Typically, a dispersion 50 exists within a space transitioning from the heavier species 46 to the lighter species 48 thereabove.

Meanwhile, the buoyant forces of gases 52 separate them in the flume 42, and within the cavity 52 of the separator 40 above the liquid species 46, 48, 50. The dispersion 50 or dispersion region 50 is the region in which the mixture introduced by the input line 43 and spreader plate 44 accumulates and conducts its slowest, separation processes.

The gases 52 or the cavity 52 full of gases 52 may be vented. A heavy line 54 may conduct the heavy species 46 out of the separator 40. A light line 56 may conduct the light species 48 out of the separator 40. Meanwhile, a gas line 58 may conduct the gases (vapors, air, natural gas, non condensables, etc.) 52 out of the cavity 52 through a gas line 58.

The gas line 58 may be directed to a flare that flares off all the VOCs, natural gas, air, and so forth. Alternatively, the gas line 58 may actually carry gases away for purposes of refining, recycling, separating, or otherwise rendering them suitable for waste disposition, commercial disposition, both, or any other combination suitable. For example, natural gas may be purified and compressed. Stack gases that are too unreliable or contain too many other volatile organic compounds may not be suitable for commercial use or transport, and may be flared off even after some other disposition of the material in the gases 52 and the gas line 58.

In the illustrated embodiment, the post-processing 14 may include or may be a centrifugal separator 60. In the illustrated embodiment, the centrifugal separator 60 or centrifuge 60 may also be referred to as a dehydrator 60.

Specifically, a laminar, annular, velocity distribution centrifuge 60 (LAVD) as disclosed in the references incorporated herein by reference is a specific device contemplated for use as the centrifuge 60. In certain embodiments, other types of separators 60 may fill that role. However, the highly controllable nature of the LAVD centrifuge makes it an ideal choice for the precise control and customized quality for the light output flow 30 resulting. Significant capacity at exceptional purity is possible with the LAVD centrifuge 60.

A tank 62 or other storage 62 is ready for and may be considered a part of the distribution 20a of the purified light species 48. As part of the disposition 20a of the light species 48, transport 64 by truck, railroad tanker, pipelines, and other transport mechanisms 64 may be part of the disposition 20a of the light species 48. Ultimately, refineries, service stations or filling stations that retail the refined constituents from the light species 48 may all be considered part of the disposition 20a of the light species 48.

In the illustrated embodiment, the heavy flow 28 or the heavy line 28 may pass the heavy species 46 from the separator 12 and through the weir 66 to arrive at a storage tank 68. The storage tank 68 fulfills, or may fulfill, multiple purposes. However, for post-processing 16 of the heavy species 46, it is sometimes valuable to add heat to the tank 68 in order to further enable the treatment of liquid effectively. In other embodiments, heating will tend to drive off gases out of solution, volatile organic compounds (VOCs), as well as urging separation of the lighter species 48.

The heavy line 54 carries the output of the heavy region 46 out for post-processing 16. In the illustrated embodiment, the weir 66 transfers gases to the line 58 proceeding from the separator 12 to the ultimate disposition 59 of gases. A separator system 66 or subsystem 66 such as a weir 66 may provide for degassing of dissolved non-condensables from the heavy species 46. Typically, a simple weir 66 may serve this function well. The weir 66 may be associated with post-processing 16 of the heavy species 46. However, in the illustrated embodiment, the weir 66 may be also grouped with the separator 12.

The tank 68 primarily represents storage. It may be fed from the centrifuge 60 through the line 34 the flow 34 of heavy species separated out from the incoming line 26. Meanwhile, the lighter species 48 has been removed to a tank 62 for eventual disposition 20a. Disposition 20a will typically be some form of transport 64 carrying the lighter species (e.g., oil) to the distribution network.

In addition to the line 34 feeding into the tank 68, the line 28 receives the output of the weir 66 that is separating out any gases and vapors to be included in the line 58 toward the disposition 59 of those gases. Gases may be captured, pressurized, compressed, and sent out through lines to transportation or distribution, or the like. In some embodiments, where the amount of gas is comparatively smaller than necessary to be economically, technologically, or commercially retrievable, then the disposition 59 may simply degenerate to a flare burning off the VOCs, natural gas, and so forth.

The storage tank 68 is drawn upon by a pump 72 pressurizing water (the heavier species from the separation processes) into a filter 70. The filter 70 may effectively employ an oleophilic filler. For example, various organic or naturally occurring plant compounds (in this case, organic means naturally occurring products, as opposed to the chemical term indicating carbon-containing compounds) such as crushed hulls of various types of nuts. Nut hulls have been found to be oleophilic, bonding with a comparatively weak bond to residual oil (the lighter species) from the various separation processes.

Typically, the fraction of oil in the water fed through the line 74 to the filter 70 is quite small. It is typically on the order of one to three percent or less. If measured by volume, the quantity is comparatively higher than when measured by mass, since oil weighs less than water. A useful feature of the filter 70 is that it may be back washed. For example, filter media may be a packed bed of an oleophilic material, such as crushed hulls of nuts. Interstices between the filter media permit a tortuous path for passage of the heavy species (e.g., water), while the oleophilic filter media (e.g., walnut hulls) attract residual lighter species (e.g., oil). As a practical matter, oleophilic (oil attracting) media tend to attract oil as a coating on the outer surface thereof, as well as absorbing oil in capillaries or comparatively small passages and porosity naturally formed therein.

Periodically, the filter 70 may be renewed by back flushing water backward through the filter 70. In such circumstances, a valve 75 may be activated to redirect the flow from the line 74 away from its forward path through the filter 70 and into the line 76. It is directed backward through the packed bed of the filter media. This results in flushing out the contained oil into the line 36 for delivery into the line 24 feeding the separator system 12.

In the illustrated embodiment, the line 36 flows into the line 24, for delivery of the contents of both into the flume 42. Inasmuch as the process of back washing the filter 70 is stripping off oil, it may be aided by heating the water introduced through the line 76 to pass back through the filter media of the filter 70. Heat tends to reduce the viscosity of oil as well as melting the longer chains, such as paraffinic materials that may exist in crude oil. Thereby, the filter 70 is renewed and the comparatively higher concentration of oil in the back flushing or back washing water sent into the line 36 may simply be disposed of in the gunbarrel separator 40 as if it were the original influent 24.

The resulting flow 32 (remember that the line 32 may represent a flow 32, as with all lines and flows herein) may thus be directed to disposal 20b in any suitable manner.

Disposal 20b of the comparatively heavy species (e.g., water, in a petroleum production embodiment) may involve further treatment. For example, brine is typically the sibling constituent to crude oil in petroleum production. Natural gas may be a third sibling. Brine may be treated for removal of various sediments during the pre-treatment 18. However, removal of salt is particularly difficult, meaning that it is typically energy intensive and may be uneconomical. In the absence of inexpensive energy, or in the absence of a desire or use for a purified water product, the disposition 20b of the output brine or salty water may simply be re-injection down a disposal well.

In alternative embodiments of a system 10 in accordance with the invention, water (e.g., brine) may be directed to an evaporation pond, a distillation system, a reverse osmosis separator, or some secondary use that can benefit from the brine. Thus, in general, a disposition 20b of the comparatively heavy species may be selected by economics, available uses, and the availability of energy and equipment for further processing as part of the disposition 20b.

Nevertheless, as articulated hereinabove, re-injection is a permissible, acceptable, and economical mechanism for disposal 20b or disposition 20b of production brine separated out from crude oil. Inasmuch as re-injection wells may be damaged or have their useful lives shortened by the presence of oil, the hybrid scavenger system in accordance with the invention increases the longevity of such disposal wells. Meanwhile, inasmuch as government permits control the number of barrels per day that may be injected into a re-injection well, the system 10 may be operated at engineered values of operating parameters for each component therein in order to maximize or optimize the amount of water (brine) re-injected, in order to obtain the maximum benefit from the associated permit.

Thus, in the embodiment of FIGS. 1 and 2, the optimization of the quality of the oil species from the separator 12 is sacrificed in order to optimize the use of the permit for brine disposition 20b in a re-injection well. Meanwhile, the filter 70 is able to operate economically because it sees a very small portion of the oil in the system. Moreover, the filter 70 may be selected and optimized in order to be very effective at removing the comparatively smallest traces of oil from the brine passing therethrough. This is possible because it need not handle excessive amounts of oil, but a very small fraction. It is scavenging nearly equal quantities as the separator 40 must. Thus, a more refined or efficient last step of separation may be accomplished by the filter 70, which is optimized to pass comparatively much brine, while extracting only a very comparatively small fraction of oil.

By the same token, the separator 60, typically embodied as a laminar annular velocity distribution centrifuge 60 may be optimized to pass a comparatively large volume of oil, requiring only the separation out of a comparatively smaller volume of water. Thus, its efficiency is capitalized upon by not requiring the comparatively larger volume of water to pass therethrough that is seen by the gun barrel separator 40 or other separator system 40.

Figure 3:
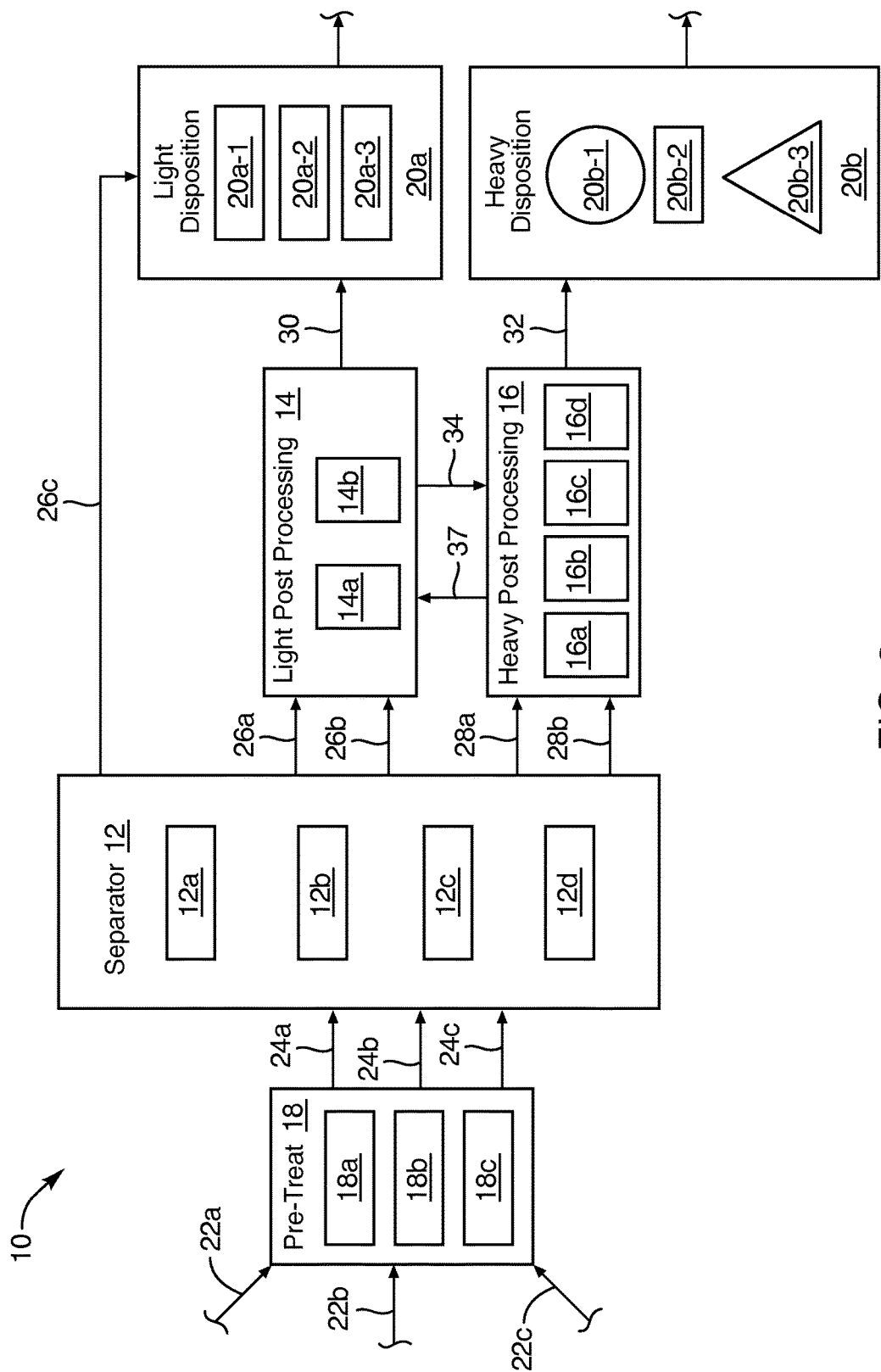
FIG. 3 is a schematic block diagram of a high level view of an alternative embodiment of a hybrid scavenger system operating in conjunction with a separator actually operated at the tuned or optimized condition for which it is engineered, designed, and constructed.
Figure 4:
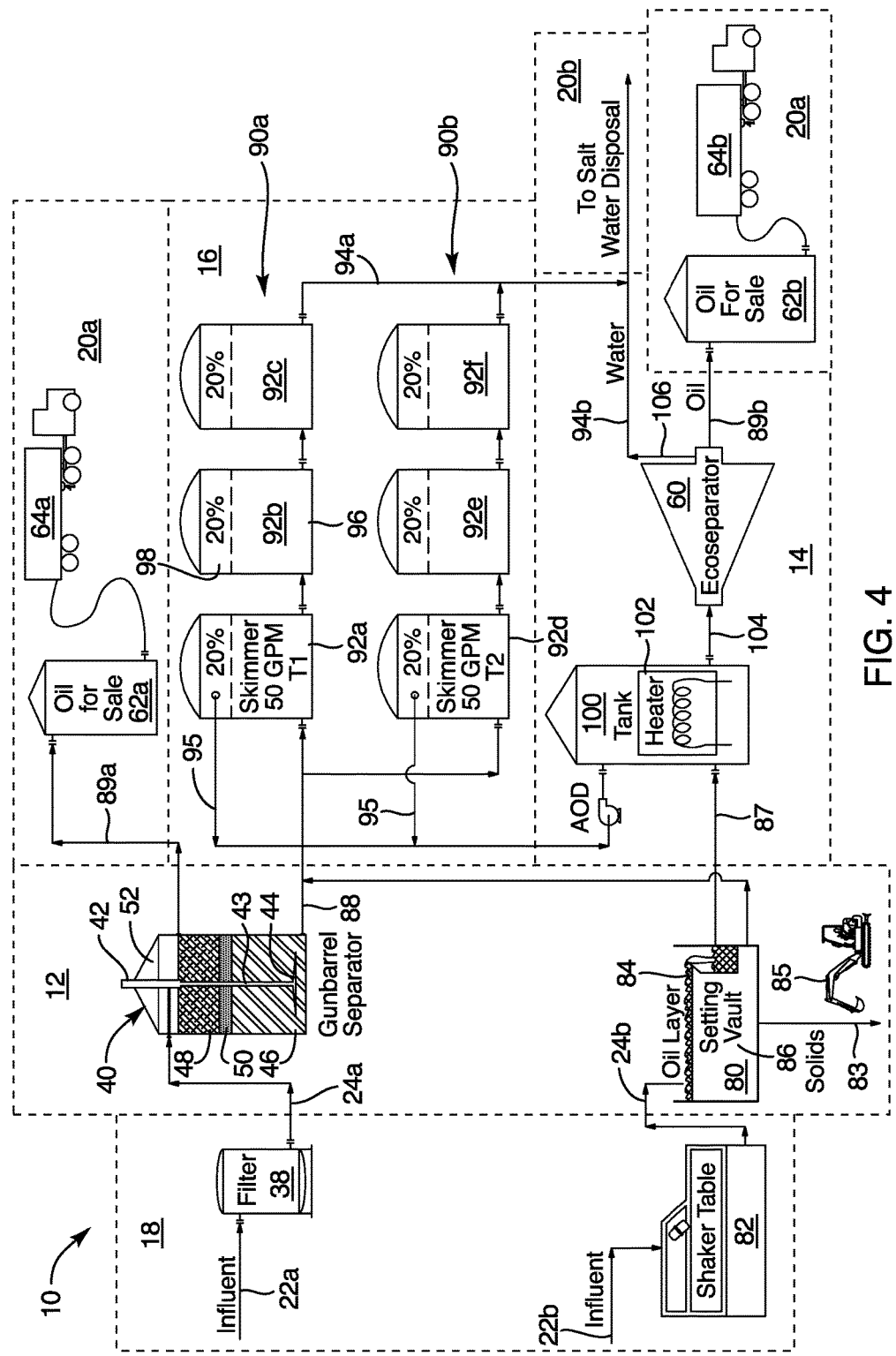
FIG. 4 is a schematic block diagram of one embodiment of they system of FIG. 3 implemented in separating out residual oil from the flow of outlet brine passed out of a conventional separator system, while also providing additional dehydration of the oil from that water in order to render that extra oil sellable as an augmentation to the regular production, all the while maintaining the cleanest water specified for re-injection into a disposal well.

Referring to FIGS. 3 and 4, while continuing to refer generally to FIGS. 1 through 4, a system 10 in accordance with the invention may be configured to rely on a separator 12 that is operating within its design range or at its design point. Thus, the separator system 12 is not being overdriven or having its design capacities exceeded.

Meanwhile, the inlet lines 22a, 22b, 22c may carry individual flows 22a, 22b, 22c (reference numbers herein may designate the physical line or the flows in those lines by the same number) reflecting the differing schedule of constituents that may exist in any particular flow 22. For example, some flows 22 may have a large fraction of gas. Others may have a comparatively larger fraction of oil than of water. Others may have a comparatively larger fraction of water than of oil. Yet others may be comparatively laden with sediments, while others are comparatively free thereof.

Accordingly, the pretreat system 18 may include one or more pre-treatment devices 18a, 18b, 18c in series or parallel arrangement. Each of the pre-treatment systems 18a, 18b, 18c may be configured, even designed and optimized, to handle the particular schedule (mixture, fractions, etc.) of constituents associated with a particular flow 22 directed thereto. In certain embodiments, one or more flows 22 may each flow into a pre-treatment system 18, and through a single, dedicated pretreat device 18a.

Each may be directed to its own pre-treatment device 18a, 18b, 18c designed, optimized, or otherwise adapted to handle the particular schedule of constituents contained in such a flow 22. On the other hand, in other embodiments, various lines 22 may be combined into various pre-treatment devices 18a, 18b, 18c.

By the same token, the influents 24 may be combined, or may be separated as individual influents 24a, 24b, 24c from specific pre-treatment subsystems 18a, 18b, 18c, and passing into individual separator devices 12a, 12b, 12c, 12d. One reason for including the multiple options for raw influent flows 22, as well as individual pre-treatment devices 18a, 18b, 18c, and separate flows 24a, 24b, 24c for the pretreated influent 24 as well as individual separator devices 12a, 12b, 12c, 12d, or the like is the intent in this embodiment to operate within the design envelope (the range of each of the controlling parameters and desired output parameters) desired from the system 10. Thus, one may think of the separator system 12 as being tuned, and may think of individual separator devices 12a, 12b, 12c, 12d as each being tuned to the conditions of their respective influent 24 and required outputs 26, 28.

Again, the outputs 26, 28 are indicated by individual flows 26a, 26b, 28a, 28b, indicating that separation of paths may be maintained or created at any stage in of the system 10. That is, when it makes engineering, chemical, or economic sense to treat flows 22, 24, 26, 28 together, that may be done. When it makes similar sense to treat them individually, that may be done. Thus, the overall system 10 may be optimized to improve throughputs and efficacies of each subsystem thereof.

Accordingly, the post-processing 14 of the light species or the comparatively light species may include a hybrid of post-processing devices 14a, 14b. Similarly, the post-processing 16 of the comparatively heavier species may also include multiple devices. Ultimately, because the separator system 12 is operating within its designed range of values for its controlling parameters, the line 26c may pass directly to the disposition 20a.

Typically, the heavy post-processing 16 may include multiple post-processor devices 16a, 16b, 16c, 16d. However, in one currently contemplated embodiment, the subsystems 16a, 16b, 16c, 16d operate in series rather than in parallel. Meanwhile, there may be combinations that operate in series and those combinations may then be operated in parallel with one another.

Also, inasmuch as the light post-processing system 14 is separating out the comparatively heavier species from the bulk of comparatively lighter species, the heavier overage line 34 may carry the separated heavier species to the heavy post processing 16. By the same token, the lighter overage line 37 may carry away to the light post processing system 14 the comparatively lighter species separated out by the heavy post processing 16. The purity levels in each of the lines 34, 37 justifies these destinations for their flows 34, 37. This is more economical and appropriate than sending either to any location farther upstream, such as the separator 12, or farther downstream, such as the final dispositions 20a, 20b.

Finally, the disposition 20a of the light species 48 may involve multiple dispositions 22a-1, 20a-2, 20a-3, and so forth. Likewise, the disposition 20b of the heavy species may involve different dispositions 20b-1, 20b-2, 20b-3, and so forth. Again, because the system 10 is being operated within its engineered range of values for the operational parameters, each device or component may be selected and engineered for a specific performance under specific conditions with specific inputs and outputs. Thus, the flows 30, 32 of the light species 48 and the heavy species 46, respectively may feed into alternative dispositions 20a, 20b or sub-dispositions thereof.

Referring to FIG. 4, in one embodiment of a system 10 in accordance with the invention, implementing the concepts and components of FIG. 3, the system 10 may center around the separator system 12. In the illustrated embodiment, a gunbarrel separator 40 receives a flow through a line 24a that has already passed through a filter 38 from a raw influent 22a in this situation. The gunbarrel separator 40 is operating within the range of its designed operational parameters. That is, each of its operational parameters is being maintained within the range for which it is designed in order to operate most effectively. This is commonly referred to as the design point, or within the tolerance range of values for each parameter corresponding to the target or design point for each.

In this instance, another raw influent line 22b feeds into a sediment capture system 82. Here, the sediment capture system 82 is embodied as a shaker table 82. A shaker table 82 is a sieve that may be level or angled and subject to vibration or oscillating motion in order to assist in sorting and passing sediments out of the flow of liquids. In the illustrated embodiment, the output of the sediment capture system 82 is a flow 24b of liquid into a second separator 80 that is selected to be a settling vault 80.

In the settling vault 80, a weir provides for separation of solids 83, and oil layer 84, and a heavy species 86 (e.g., water, brine) therebelow. The solids 83 may be a combination of solids settled out in the settling vault 80 as well as solids that are separated out by the shaker table 82. In certain embodiments, a shaker table 82 may have some amount of "supernatant" fluid at the top that is "clean" and well away from sediments at the bottom. It may be passed on.

However, the sediment-laden materials are specifically the type of influent 24b for which a settling vault 80 is designed. The settling vault 80 can handle the more sludge-like materials containing basic sediments. By relying on the settling vault 80, the heavier species 86 is free to be passed through to the line 88. Meanwhile, the oil layer 84 results in the outflow 87 through the line 87 to the light post-processor 14, and specifically, in the illustrated embodiment, to a tank 100.

One will note that the gunbarrel separator 40, being operated within this design range, produces a flow 89a suitable for a storage tank 62a. It is market ready and suitable for some means of transport 64a for disposition 20a as a marketable product meeting market specifications.

Meanwhile, the output 88 or the line 88 carries the heavy species (e.g., water, brine) into the heavy post-processor 16. Here, the cascades 90 include series 90 of tanks 92. For example, a cascade 90*a* includes the tanks 92*a*, 92*b*, 92*c*. Similarly, a parallel cascade 90*b* includes the tanks 92*d*, 92*e*, 92*f*. These tanks 92 are cascaded because they each receive substantially, and in turn, the flow from the line 88.

The mechanism of operation is that each of the tanks 92 includes a skimmer that continually removes the oil rich (light-species-rich) material near the top thereof. For example, the heavy species in the line 88 passes into each tank 92*a*, 92*b*, 92*c* of a particular cascade 90*a* or series 90*a* in turn. Each succeeding tank (92*b* after 92*a*, and 92*c* after 92*b*) receives a more nearly pure or better separated heavy species. Less the skimmed, oil-rich top layer in each tank 92*a*, 92*b*, 92*c*, virtually the entire flow 88 is eventually directed to a return 94.

Meanwhile, a return 95 connected to each of the tanks 92, not all of which returns are illustrated, for sake of clarity, returns the oil-rich skimmings 98 or the light constituent 98. As a practical matter, the light material 98 is typically a mixture rich in the lighter species (e.g., oil), but still containing a substantial fraction of the heavy species (e.g., water, brine). The heavy species 96 in subsequent adjacent tanks 92 has less and less of the light species.

In some regards, each cascade 90*a*, 90*b* acts as a staged settling tank 90*a*, 90*b* by staging the separation out of the lighter material 98 or light mixture 98. One will note that the path for the light return 95 is pumped to the tank 100. Regardless of the point at which the lines 95, 87 are introduced into the tank 100, a heater 102 may add heat in order to decrease the viscosity of the oil constituents in the tank 100. In this way, the heated material retrieved from the tank 100, and passed through the dehydrator 60 or centrifuge 60 of FIG. 4 is more easily separated. Again, heavier molecules, and those of higher melting point may be well served by the heater 102 in order to render all constituents liquid and readily separable in the separator 60.

Of course, the separator 60 will typically be a laminar annular velocity distribution centrifuge as discussed hereinabove and as described in detail in the references incorporated herein by reference. Ultimately, the separator 60 is handling a comparatively smaller quantity of the lighter species 48 than is the gunbarrel separator 40. Thus, the increased cost is warranted by the value of the flow 89*b* that is eventually stored in a tank 62*b* and shipped by a transport 64*b* as part of the final disposition 20*a*.

Note that the tank 62*a* from the gunbarrel separator 40 may be the same tank as the tank 62*b*. That is, both the tanks 62*a*, 62*b* represent the lighter species (e.g., oil) at the minimized water content suitable for the pre-selected specification for the market and price to which each is to be transported 64*a*, 64*b* respectively. Meanwhile, the flow 94*a* from the cascades 90*a*, 90*b* of tanks 92 are properly separated having had their small amount of oil scavenged therefrom. They pass to the disposal 20*b* the brine 46 or heavy species 46.

Similarly, the line 106 from the centrifuge 60 has the benefit of a very controllable and efficient separation. This renders the flow 106 devoid of any significant amount of the light species (oil) and therefor ready for final disposition 20*b*.

One will note that in the illustration of FIG. 4, the hybrid scavenging relies on tanks 92 in order to scavenge the remaining oil out of the water. It uses the more sophisticated and consequently more expensive centrifuge 60 in order to scavenge the last water out of the oil. Thus, two systems 14, 16 each provide the result that each can accomplish best, most effectively, and most economically.

Likewise, is the separator system 12, or the core separator system 12, the gunbarrel separator 40 and a settling vault 80, or other systems 12 for this purpose. Each handles the type of fluids, solids, gases, and so forth for which they are designed. Thus, the hybrid scavenger system including the light post-processor 14 and heavy post-processor 16 provides for economical retrieval of oil that has market value, while at the same time providing for improved quality of water in the output 94*b* directed to ultimate disposition 20*b*. Alternatively, as illustrated in FIG. 3, the output 94*b* may be directed as a flow 34 into the heavy post processing system 16.

In certain embodiments, the filter 38 may be of any particular type, including a series of filters 38, parallel flow of filters, or the like as most economical and beneficial. For example, one type of filter 38 may be a cyclone filter. This may be of a multi-phase cyclone or a hydro cyclone for liquids in which materials are separated out by centrifugal forces. In other embodiments, a trap, such as a quick turn in a line may throw sediments or heavier materials out into a trap, because they cannot remain within the fluid turning a corner. For example, if a significant amount of gas is present, sediments may be thrown out of gas by turning the gas around past a trap at a sharp corner in a line. Thus, isolating the sediment particles is possible because they must continue straight on into the trap, being unable to turn the corner with the surrounding gases.

By the same token, the settling vault 80 is typically best suited for large fractions of sediment, thick oils having very high viscosity, or both. Some types of crude oil actually appear as thixotropic liquids. That is, they are self sustaining, and do not flow, they are sticky, having a consistency of petroleum jelly, for example. If sludges and thicker or more viscous oils are encountered, a settling vault 80 may be the best mechanism for separating them. This is especially so when large solids content may be entrained therein.

Solids (grit, sand, or the like) are more typically entrained with and carried along with a more viscous material. If that material is heated or if the main constituents of lighter species (oil) are otherwise less viscous, then sediment particles of comparatively smaller sizes are able to drift out of suspension to be removed as solids 83. Typically, the removed solids 83 may be hauled away by mechanical equipment 85 for the purpose.

For example, scrapers in the settling vault 80 may scrape solids in sludges to a location for removal. Solids on excavated floors or drawn up inclined surfaces rising out of the heavy species 86, may be scraped out and removed to a drying pad. Ultimately, the solid materials can be treated as the grit, rock, and the like that they are by mechanical equipment 85.

Typically, the gunbarrel separator 40 is tuned for the particular level of dehydration (lack of water, or removal of water) required to meet a particular market price. Accordingly, the gunbarrel separator 40 may necessarily have to sacrifice purity of the heavier species 46. The result is that a better price is available due to a better quality in the output 89*a* being sent to storage 62*a* for sale. However, this leaves an economically significant amount of the lighter species 48 still in the heavier species 46 exiting through the line 88.

The hybrid scavenging system of the cascades 90*a*, 90*b* (which may be fewer or more cascades in any particular embodiment, and may include fewer or more individual tanks 92 in each cascade 90) help recover the value.

The other leg or path of the hybrid scavenging is that of the tank 100 and the centrifuge 60. Again, the comparatively smaller volume of the flows 87, 95 into the tank 100, result in the flow 104 into the centrifuge 60. The LAVD centrifuge 60 is a comparatively more expensive, more sophisticated, more controllable, and more efficacious device in which separation may occur. Thus, it need not be sized to treat the entire volume of the flow 89*a*. Another rate may not and need not be practical through the centrifuge 60. The cost of the equipment would simply be too large.

However, the hybrid scavenging process using the light post-processor 14 as one scavenger 14, and the heavy post-processor 16 as the second scavenger 16 provides an economically attractive separation process. It improves the quality of the disposition 20*b* of the heavier species 46. It simultaneously provides an economically significant and easily justifiable flow 89*b* of the lighter species for transport 64*b* to some other final disposition 20*a* in a market that will reward the purity thereof.

The skimmer is typically a float with a head responding to suction from a pump. Thus, a skimmer in each of the tanks 92 removes an oil-rich top layer mixture with water. Meanwhile, the heater 102 is optional in order to reduce oil viscosity if needed or appropriate. Typically, the centrifuge 60 handles primarily water as its influent 104. Indeed, it is acting as a scavenger 14, trying to remove the last vestiges of oil, as far as economically possible, from the discharged water 94*b*. Typically, a centrifuge 60 need only handle about 3,000 barrels per day. In contrast, the gunbarrel separator 60 may actually be handling on the order of 15,000 to 20,000 barrels per day or more of influent 24*a*.

In a produced water influent 22, having already been subject to some initial separating tank, a produced water influent on the order of about 15,000 barrels per day may result from a well or series of wells. This water will contain about three percent oil dispersed in water. After passing through a gunbarrel separator 40, an outflow 54, 88 may typically be on the order of about one percent oil dispersed in water (OIW). Thus, a storage tank 68, 92 may be expected to see on the order of about 15,000 barrels per day of water with about one percent of oil. That water will eventually be sent to final disposition 20*b* in a re-injection well having a permit of on the order of 20,000 barrels per day. Thus, an additional ⅓ more production water could be re-injected under the provisions of that permit.

Meanwhile, a gunbarrel separator 40 having received about 15,000 barrels per day of produced water having about three percent oil in water is capable of producing over 350 barrels per day of oil, with about two to four percent of basic sediments and water (BS&W) contained therein. Thus, each can be improved by using the hybrid scavenger system 10 as described hereinabove.

In pretreat 18 or pre-treatment systems 18, upstream of a separator system 12, some treatments may include chemical additives such as hydrochloric acid (HCl). Likewise, electrolytic oxidation may be used. Other chemical additives may be added such as polymers, including polyphosphate, polycarbonates, or the like. These tend to assist in coalescing oil for separation in the gunbarrel separator 40.

Similarly, a shaker table 82 receiving a flow of about 15,000 barrels per day of basic sediments and water may expect to have about three percent oil in water at typical values of standard operating parameters. However, in a system 10 in accordance with the invention, as illustrated in FIGS. 1 and 2, such a system may be overdriven to 20,000 barrels per day, thus, the heavy post-processor 16 operating as a heavy scavenger arm 16 may typically handle about 200 barrels per day. Thus, it may result in 20,000 barrels per day of water, through an overdriven gunbarrel separator 40, with less than five to 30 parts per million of oil in water. This compares with the 15,000 barrel per day throughput at one percent oil and water that would be typical from a gunbarrel separator 40 operating at its design point.

Meanwhile, the light post-processor 14 with its LAVD centrifuge 60 will typically see 370 barrels per day at two to four percent basic sediments and water contained therein as an output of a gunbarrel separator 40 operating within its typical range of its operating parameters. In contrast, such a system may now run about 620 barrels per day at about 0.5 percent basic sediments and water remaining. Thus, the quality of the output 30 available for disposition 20*a* in a market will command a much better price as being much better dehydrated.

The heavy species output 32 or water 32 being disposed of as re-injected brine may be disposed of much more economically, safely, and efficaciously because it does not contain appreciable contaminating oil, and the overdriven gunbarrel separator 40 can now deliver in the disposition line 32 somewhere on the order of 20,000 barrels per day, thus maximizing the use of the re-injection permit.

In summary, in one analysis, an injection well that disposes of 15,370 barrels per day was able to be upgraded to 20,620 barrels per day, an increase of about 34 percent in production. Meanwhile, the oil content recovered for market under this analysis went from 370 barrels to 620 barrels per day, a 68 percent increase. Meanwhile, the production water re-injected went from 15,000 barrels per day at about one percent oil in water to 20,000 barrels per day at less than five parts per million oil in water. Thus, in addition to maximizing value of the injection well, the injection well is better preserved. This all results in reduced costs for disposition of production water, while the oil recovered was substantially increased, improving the economics of the hybrid scavenging system 10.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for separating a comparatively heavy species from a comparatively light species, the method comprising:
    providing a separator system, receiving an influent and separating the influent into a comparatively lighter species and a comparatively heavier species;
    overdriving the separator system, outputting at least one effluent stream, by operation of the separator system at a throughput rate greater than that of a design point specifying a maximum throughput and operating conditions therefor;
    providing at least one scavenger, receiving the at least one effluent stream comprising predominantly one of the comparatively heavier species and the comparatively lighter species;
    remediating, by the at least one scavenger, a degraded performance of the separator system, arising due to the overdriving of the separator system, by removing an additional quantity of one of the comparatively heavier species and comparatively lighter species from the at least one effluent stream.

2. The method of claim 1, further comprising:

operating the at least one scavenger to receive the comparatively lighter species output by the separator and to rectify the comparatively lighter species to a value of purity corresponding to a preselected market price.

3. The method of claim 1, further comprising operating the at least one scavenger to remove from the comparatively heavier species traces of the comparatively lighter species down to a value preselected for optimizing at least one of:

maximizing the amount of disposal of the comparatively heavier species permitted by a government-issued permit; and maximizing the longevity of a re-injection disposal site by reduction of the fraction of contained contaminants corresponding to the comparatively lighter species.

4. The method of claim 1, wherein the at least one scavenger includes a first scavenger and a second scavenger, the method further comprising:

operating the first scavenger to receive the comparatively lighter species output by the separator and to rectify the comparatively lighter species to a value of purity corresponding to a preselected market price; and operating the second scavenger to remove from the comparatively heavier species traces of the comparatively lighter species down to a value preselected for optimizing at least one of maximizing the amount of disposal of the comparatively heavier species permitted by a government-issued permit, and maximizing the longevity of a re-injection disposal site by reduction of the fraction of contained contaminants corresponding to the comparatively lighter species.

* * * * *